(12) United States Patent
Sakai et al.

(10) Patent No.: US 6,170,591 B1
(45) Date of Patent: Jan. 9, 2001

(54) AUTOMATIC STEERING APPARATUS FOR VEHICLES

(75) Inventors: Katsuhiro Sakai; Yasuo Shimizu, both of Wako (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 08/992,339

(22) Filed: Dec. 17, 1997

(30) Foreign Application Priority Data

Dec. 17, 1996 (JP) .................................................. 8-336958

(51) Int. Cl.$^7$ ........................................................ B60S 9/00
(52) U.S. Cl. ............................................................. 180/204
(58) Field of Search ............................ 180/167–169, 180/199, 204, 202; 318/580, 587; 701/40, 70, 22, 117, 300

(56) References Cited

U.S. PATENT DOCUMENTS

| | | | |
|---|---|---|---|
| 4,735,274 | * | 4/1988 | Good .................................... 180/204 |
| 4,931,930 | * | 6/1990 | Shyu ................................ 364/424.01 |
| 5,742,141 | * | 4/1998 | Czekaj ................................. 318/587 |
| 5,793,631 | * | 8/1998 | Ito ..................................... 364/449.5 |

FOREIGN PATENT DOCUMENTS

| | | |
|---|---|---|
| 62-278477 | 12/1987 | (JP) . |
| 3-74256 | 3/1991 | (JP) . |
| 4-55168 | 2/1992 | (JP) . |

OTHER PUBLICATIONS

PATENT ABSTRACTS OF JAPAN, vol. 1995, No. 6 Jul. 31, 1995 & JP 07 081604, Mar. 28, 1995.

* cited by examiner

*Primary Examiner*—Christopher P. Schwartz
*Assistant Examiner*—C. T. Bartz
(74) *Attorney, Agent, or Firm*—Arent, Fox, Kitner, Plotkin & Kahn PLLC

(57) ABSTRACT

An apparatus is provided to correctly judge whether an automatic parking control operation can be accomplished when an obstacle exists in the path of movement of a vehicle, and thus enables the vehicle to be parked easily and reliably. In order that the vehicle can be parked along the locus of movement, an automatic steering operation is carried out on the basis of a relation between a traveling distance of the vehicle stored in advance and a reference steering angle. When the automatic parking control operation is interrupted due to the existence of the obstacle, a judgment whether or not the continuation of the automatic parking control operation is possible is made on the basis of the condition of the obstacle detected by a sonar, radar, a television camera, and the like and the locus of movement of the vehicle. When the continuation of this operation is impossible, the steering angle of the vehicle is reproduced in a reverse direction, and the vehicle is thereby returned to the starting position. The position of the vehicle is thereafter corrected to again start the parking operation by the driver's steering operation or by automatic parking operation.

13 Claims, 7 Drawing Sheets

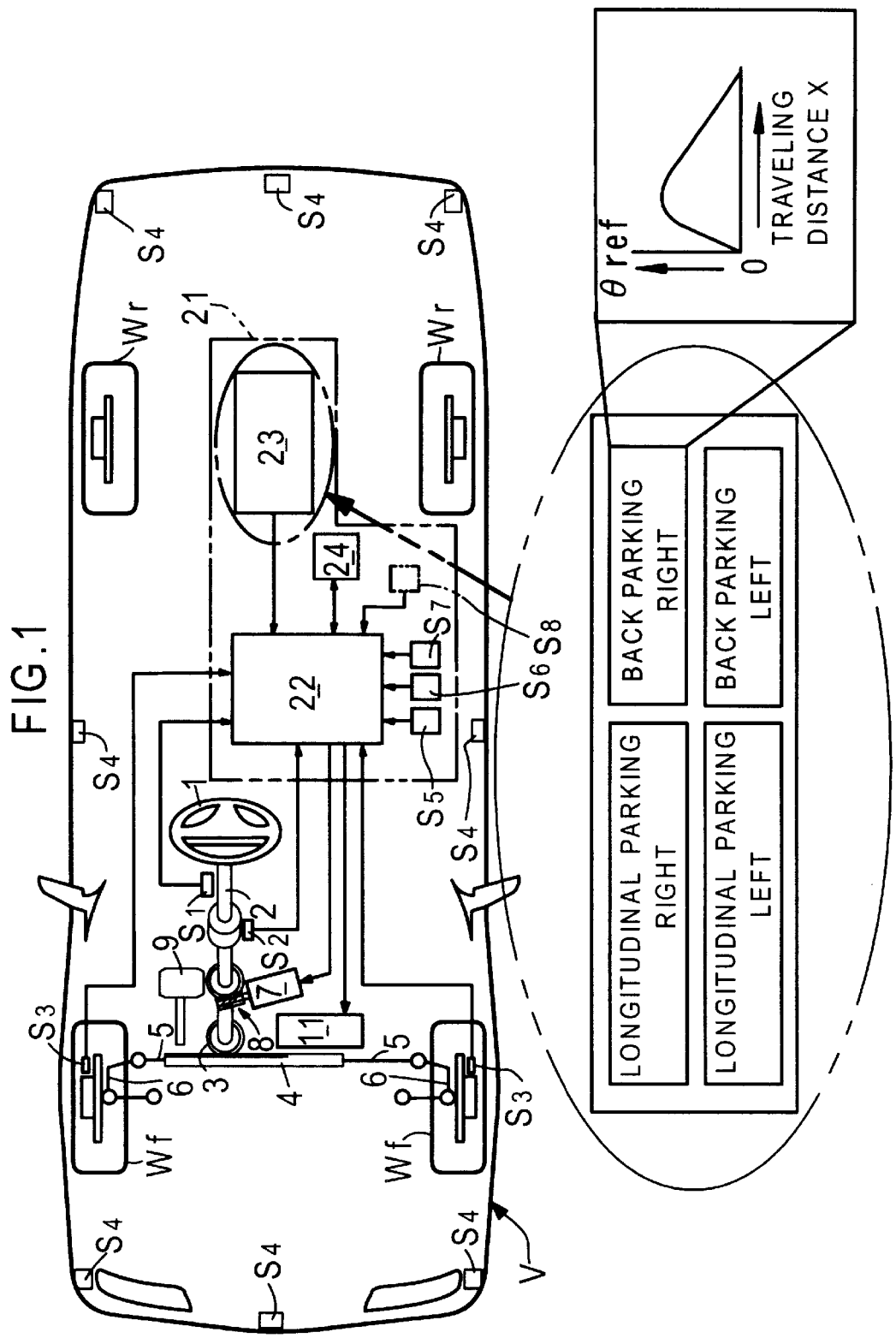

AUTOMATIC STEERING APPARATUS FOR VEHICLES

BACKGROUND OF THE INVENTION

1. Field of the Invention

This invention relates to an automatic steering apparatus for a vehicle, to automatically park the vehicle without a driver's steering operation.

2. Description of the Prior Art

An automatic steering apparatus is known which utilizes an actuator of a known electrically powered steering apparatus, and is adapted to automatically carry out the back parking and longitudinal parking of a vehicle by controlling the actuator on the basis of the relation between the distance of movement of the vehicle and the steering angle which are stored in advance. Such an apparatus is disclosed in Japanese Patent Application Laid-Open Nos. 3-74256 and 4-55168.

An automatic steering apparatus, which is used when a vehicle is put into a garage and is adapted to predict the travel path of the vehicle on the basis of the output from a steering wheel angle sensor, to detect the distance between the vehicle and an obstacle on the basis of the output from a distance sensor provided on a corner portion of the vehicle, to show a travel path of the vehicle and the position of an obstacle on a display, and to give the driver an alarm when the distance between the vehicle and the obstacle is less than a predetermined amount, is already known from Japanese Patent Application Laid-Open No. 62-278477.

In the apparatus of the type disclosed in the above-mentioned Japanese Patent Application Laid-Open Nos. 3-74256 and 4-55168, a vehicle moves from a starting position to a parking position through a locus of movement stored in advance. Therefore, when the starting position is not the stored position, or when an obstacle exists on the locus of movement of the vehicle, the automatic parking control operation cannot be continued due to the interference of the obstacle with the vehicle. Even when the automatic parking control operation can be resumed by only slightly correcting the starting position and locus of movement, it is necessary in the conventional apparatuses to restart the automatic parking control operation from the beginning or to stop the automatic parking control operation, whereby the function of the apparatus cannot be fully utilized in some cases.

The apparatus disclosed in Japanese Patent Application Laid-Open No. 62-278477 mentioned above is applied to the parking of a vehicle by the driver's voluntary steering operation, and not to automatic parking control operation. Moreover, this apparatus is adapted to only caution the driver on the basis of the distance between the vehicle and an obstacle, and does not judge whether the vehicle can be parked or not.

SUMMARY OF THE INVENTION

The present invention has been accomplished in view of these facts, and the object is to accurately judge whether or not automatic parking control operation can be carried out when an obstacle exists on the locus of movement of the vehicle, and thereby enable the parking of the vehicle to be accomplished easily and reliably.

To achieve this object, according to the present invention, a judging means judges whether the execution of an automatic steering control operation can be continued on the basis of the content stored in a storage means when the automatic steering control operation by a control means is interrupted. Consequently the driver can decide accurately, on the basis of the results of the judgment, whether the automatic parking control operation is to be continued, or whether the parking of the vehicle is to be tried again after the vehicle is returned to the original position along the path previously taken by the vehicle, thereby completing parking of the vehicle in a minimum period of time with minimum labor.

In the present invention, the storage means stores the locus of movement of a vehicle as a wheel steering angle with respect to the traveling distance of the vehicle, so that a predetermined locus of movement can always be secured even when the vehicle speed varies during automatic steering control operation.

According to the present invention, when the judging means judges that the execution of the automatic steering control operation is impossible, an informing means informs the driver of the impossibility, so that the driver can select another parking method instead of continuing the execution of the automatic steering control operation.

According to the present invention, when the judging means judges that the automatic steering operation cannot be continued, the judging means further judges whether the resuming of the automatic steering control operation due to a change of the automatic steering control operation starting position can be accomplished, or whether the resuming of the automatic steering control operation due to a change of the locus of movement of the vehicle can be accomplished, on the basis of the content stored in the storage means. When the resuming of the automatic steering control operation can be effected, the parking of the vehicle can be completed in a minimum period of time with minimum labor by resuming the same operation, and, when the resuming of the automatic steering control operation is impossible, this operation can be stopped.

According to the present invention, the judging means starts judging whether or not the automatic steering control operation can be resumed when the driver operates a switch means, so that the judging of the possibility of the resumption of the automatic steering control operation can be done according to the intention of the driver.

According to the present invention, the control means guides the vehicle to the position in which the automatic steering control operation can be resumed when the judging means judges that the resumption of the automatic steering control operation is possible, so that the driver can resume the automatic steering control operation easily.

According to the present invention, the vehicle can be guided reliably to the position in which the automatic steering control operation can be resumed since the guide path along which the vehicle is guided to the intended position, is stored in advance in the storage means.

According to the present invention, an informing means informs the driver of the position in which the resumption of the automatic steering control operation becomes possible or the traveling path to this position when the judging means judges that the resumption of the automatic steering control operation is possible, so that the driver can move the vehicle reliably to the position.

According to the present invention, the vehicle can be guided reliably to the position in which the resumption of the automatic steering control operation becomes possible since such a position or a traveling path to the position is stored in advance in the storage means.

According to the present invention, the judging means judges that the automatic steering control operation can be resumed when the remaining distance of movement of the vehicle, at the point where the automatic steering control operation is interrupted, in the direction of advance of the vehicle which is stored in the storage means is not greater than a predetermined level, so that judgment whether the resuming of the automatic steering control operation can be done or can be carried out accurately.

BRIEF DESCRIPTION OF THE DRAWINGS

FIGS. 1–3B illustrate a first embodiment of the present invention.

FIG. 1 is a diagram of a vehicle provided with a steering control apparatus of the present invention.

FIGS. 3A and 3B are drawings illustrating the operation of the apparatus where an obstacle interferes with the vehicle during automatic parking control operation.

FIGS. 4–8B illustrate a second embodiment of the present invention.

FIG. 4 is a drawing showing the positional relation between the vehicle and obstacles.

FIG. 5 is a drawing illustrating the avoiding of an obstacle A.

FIG. 6 is a drawing illustrating the avoiding of an obstacle B.

FIGS. 8A and 8B are drawings illustrating the avoiding of an obstacle D.

DETAILED DESCRIPTION OF THE PREFERRED EMBODIMENTS

Figure 2A:
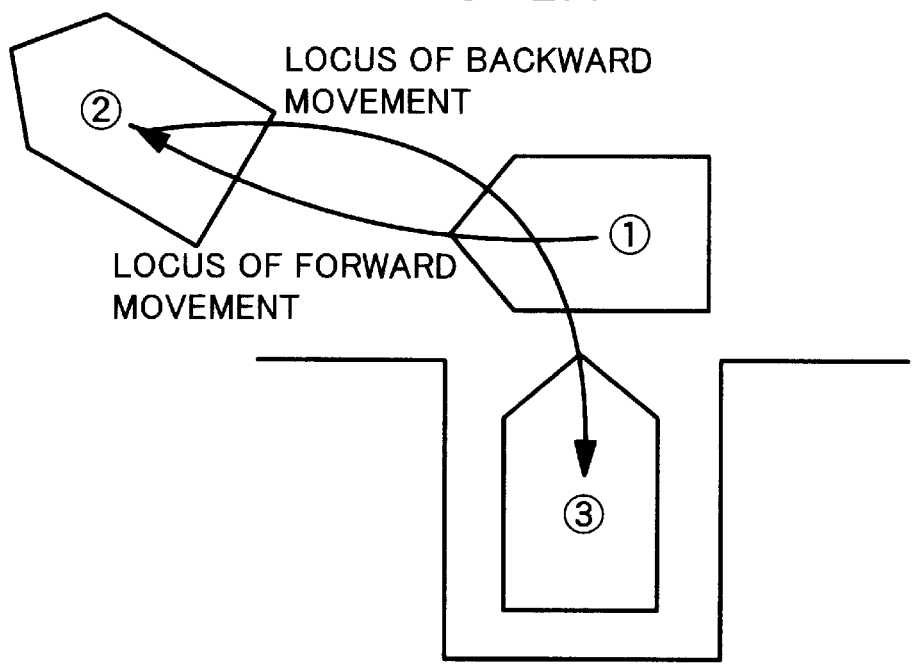
FIGS. 2A and 2B are drawings illustrating the operation of the apparatus where an obstacle does not interfere with the vehicle during an automatic parking control operation.

As shown in FIG. 1, a vehicle V is provided with a pair of front wheels Wf, Wf and a pair of rear wheels Wr, Wr. A steering wheel 1 and the front wheels Wf, Wf, which are steered wheels, are connected via a steering shaft 2, which is rotated with the steering wheel 1, a pinion 3 provided at the lower end portion of the steering shaft 2, a rack 4 meshed with the pinion 3, left and right tie rods 5, 5 provided on both ends of the rack 4, and left and right knuckles 6, 6 coupled to the tie rods 5, 5. To assist the driver in operating the steering wheel 1, or, to carry out automatic steering operation for the purpose of parking the vehicle which will be described later, a steering actuator 7 comprising an electric motor is connected to the steering shaft 2 via a worm gear mechanism 8.

A steering control apparatus 21 comprises a control unit 22, a storage unit 23 and a judging unit 24. The control unit 22 is adapted to receive input signals from a steering angle detecting means $S_1$ for detecting the steering angle $\theta$ of the front wheels Wf, Wf on the basis of the angle of rotation of the steering wheel 1, a steering torque detecting means $S_2$ for detecting the steering torque of the steering wheel 1, rotation angle detecting means $S_3$, $S_3$ for detecting the angles of rotation of the left and right front wheels Wf, Wf, and a total of eight object detecting means $S_4$ provided on front, intermediate and rear portions of the vehicle V. The object detecting means $S_4$ comprises known sensors, such as sonar, radar or television cameras. The lines by which the eight object detecting means $S_4$ and control unit 22 are connected together are omitted so as to prevent complication of the drawing.

A mode selecting switch $S_5$ operated by the driver, an automatic parking start switch $S_6$, an obstacle avoiding switch $S_7$ and resumption judging switch $S_8$ are further connected to the control unit 22. The mode selecting switch $S_5$ is operated when one of four parking modes, i.e. a back parking/right mode, a back parking/left mode, a longitudinal parking/right mode and a longitudinal parking/left mode is selected. The automatic parking start switch $S_6$ is operated after the automatic parking operation in one mode selected by the mode selecting switch $S_5$ is started. The obstacle avoiding switch $S_7$ is operated when the judging unit 24 judges that the continuation of the execution of automatic parking control operation is impossible. The resumption judging switch $S_8$ is used in a second embodiment which will be described later.

The storage unit 23 stores data, in advance, in the form of a table on the four parking modes, i.e. the relation of a standard steering angle $\theta$ref with respect to the distance of movement X of the vehicle V. The distance of movement X of the vehicle V is determined by multiplying a known circumferential length of the front wheel Wf by the angles of rotation of the front wheels Wf detected by the front wheel angle-of-rotation detecting means $S_3$, $S_3$. In the calculation of the distance of movement X, a high selected value, a low selected value or an average value of the outputs from the left and right front wheel angle of rotation detecting means $S_3$, $S_3$ may be used.

The judging unit 24 superposes the condition of an obstacle detected by the object detecting means $S_4$ on an estimated locus of movement of the vehicle stored in the storage unit 23, and, when the obstacle interferes with the estimated locus of movement of the vehicle, the judging unit 24 judges that the continuation of automatic parking control operation is impossible.

The control unit 22 is adapted to control the operation of the steering actuator 7 and the operation of an operation stage display unit 11 comprising a liquid crystal monitor on the basis of signals from the detecting means $S_1$–$S_4$ and switches $S_5$–$S_7$, data on the parking modes stored in the storage unit 23, and occurrence or non-occurrence of the interference of an obstacle with the vehicle judged in the judging unit 24. The operation stage display unit 11 constitutes an alarm means in the present invention, and is provided with a loudspeaker for giving a vocal instruction to the driver.

The operation of the embodiment of the present invention having the above-mentioned arrangement will now be described.

In a normal condition (in which the automatic parking start switch $S_6$ is not on) in which the automatic parking of the vehicle is not done, the steering control apparatus 21 functions as a general power steering control apparatus. When the driver operates the steering wheel 1 so as to turn the vehicle V, the steering torque detecting means $S_2$ detects the steering torque applied to the steering wheel 1, and the control unit 22 in the steering control apparatus 21 drives the steering actuator 7 on the basis of the steering torque. As a result, the left and right wheels Wf, Wf are steered by the driving force of the steering actuator 7 to assist the driver's steering operation.

The content of automatic parking control operation will now be described taking as an example a back parking/left mode (mode in which the vehicle V is parked in a left-hand parking position as the vehicle is moved backwards).

First, as shown in FIG. 2A, the vehicle V is moved to a position in the vicinity of a garage in which the vehicle is to be parked, and it is then stopped in a position (starting position 1), in which a predetermined reference (for example, a left-hand side mirror) is aligned with the center line of the garage, with the left side surface of the vehicle body positioned as close as possible to the entrance line of the garage. When the mode selecting switch $S_5$ is operated to select the back parking/left mode and the automatic parking start switch $S_6$ is turned on, automatic parking control operation is started. During this automatic parking control operation, the operation stage display unit 11 displays the actual position of the vehicle, obstacles around the vehicle, the parking position, the estimated locus of movement of the vehicle from the starting position to the parking position and the position in which the forward movement of the vehicle is changed to backward movement thereof, while various kinds of instructions and alarms are being given vocally from the loudspeaker to the driver.

When the driver makes his vehicle V creep by loosening a brake pedal 9 during automatic parking control operation, the front wheels Wf, Wf are automatically steered on the basis of the data on the back parking/left mode selected by the mode selecting switch $S_5$, even if the driver does not operate the steering wheel 1. Namely, while the vehicle travels forward from the starting position 1 to the reversing position 2, the front wheels Wf, Wf are turned rightward automatically, and, while the vehicle travels backward from the reversing position 2 to a parking completing position 3, the front wheels Wf, Wf are turned leftward automatically.

Figure 2B:
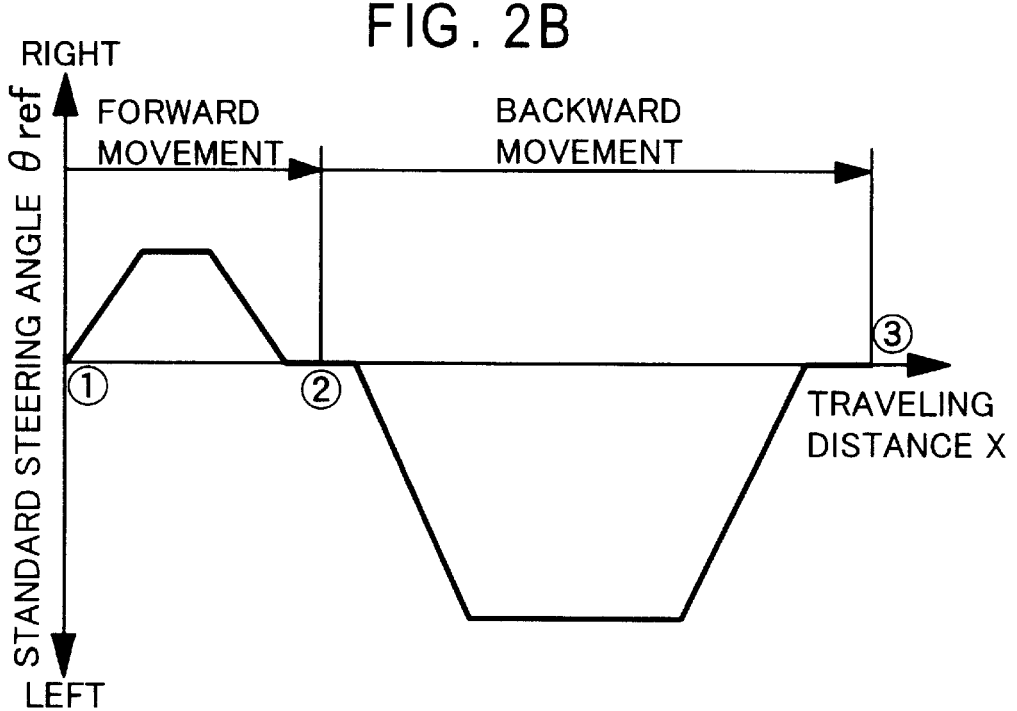

As is clear from FIG. 2B, the control unit 22 calculates while the automatic steering operation is carried out, the deviation E=θref−θ on he basis of a standard steering angle θref in the back parking/left mode read out from the storage unit 23 and the steering angle θ inputted from the steering angle detecting means $S_1$, and controls the operation of the actuator 7 so that the deviation E becomes zero. During this time, the vehicle V always travels on the locus of movement thereof even when the creeping speed varies since the data on the standard steering angle θref is set corresponding to the traveling distance X of the vehicle.

Figure 3A:
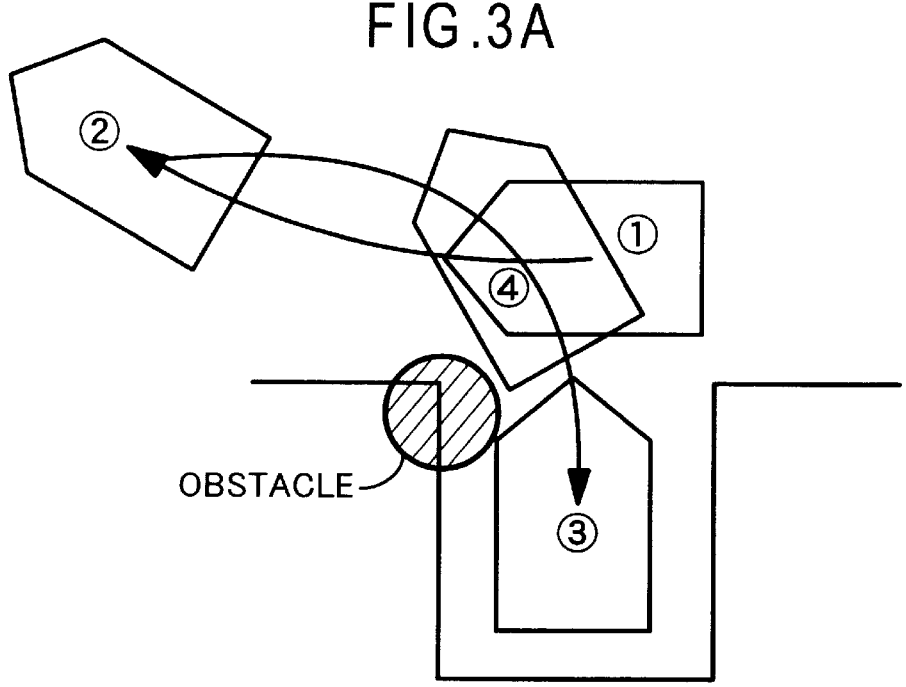

When there is a possibility that an obstacle may interfere with the vehicle V in, for example, a position 4 as shown in FIG. 3A, during the automatic parking control operation of the vehicle, the driver stops the vehicle V and interrupts the automatic parking control operation. The judging unit 24 judges whether the vehicle can reach the parking position 3 without interfering with the obstacle, on the basis of an estimated locus of movement of the vehicle V stored in the storage unit 23 and the condition of the obstacle detected by the object detecting means $S_4$. When a judgment that the automatic parking control operation can be continued is made, this judgment is reported to the driver by the display on the operation stage display unit 11 or vocally, so that the driver can continue the automatic parking control operation with a sense of security.

Figure 3B:
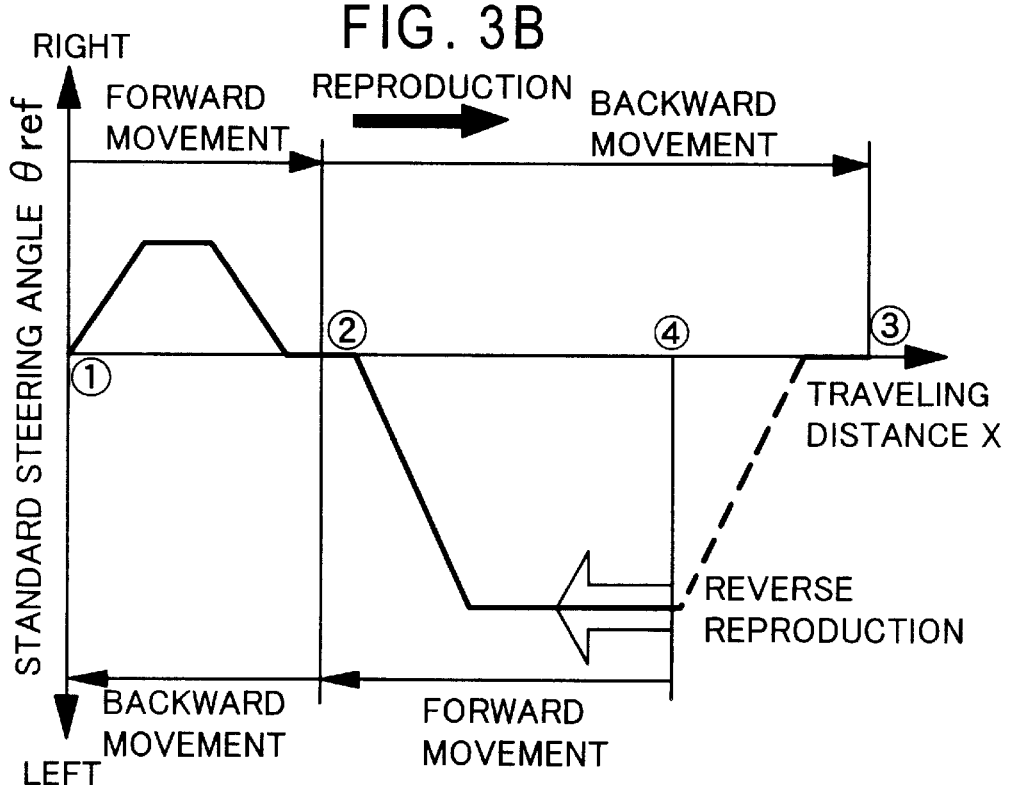

When the judging unit 24 judges that an obstacle will interfere with the vehicle if the automatic parking control operation continues as it is, this judgment is reported to the driver by the operation stage display unit 11. When the driver then turns on the obstacle avoiding switch $S_7$, the standard steering angle θref which has been outputted in the order of 1, 2, 4 is reversely reproduced and outputted in the order of 4, 2, 1 as shown in FIG. 3B, and the vehicle V travels in reverse following the original locus. After the vehicle V has been returned to, for example, the reversion position 2, the driver may try to park the vehicle again by his voluntary steering operation so as to avoid the obstacle. After the vehicle V has been returned to the starting position 1, the starting position 1 is corrected so that the vehicle can avoid the obstacle. The automatic parking start switch $S_6$ may then be turned on to park the vehicle again automatically.

When the driver notices an obstacle and interrupts the automatic parking control operation in this manner, the judging unit 24 judges whether the automatic parking control operation can be continued or not, and reports the result of the judgment to the driver. Therefore, the driver can accurately judge whether the automatic parking control operation should be continued as it is, or whether the vehicle should be moved back along the original path and the driver should carry out the parking operation again, and the driver can complete the parking operation in a minimum period of time with minimum labor.

The second embodiment has the same arrangement as the first embodiment and has a judging unit 24 provided with a resumption judging switch $S_8$ for judging whether or not the resumption of an automatic parking control operation becomes possible due to the correction of the starting position or the locus of movement when the judging unit 24 judges that the continuation of the automatic parking control operation is impossible.

Figure 4:
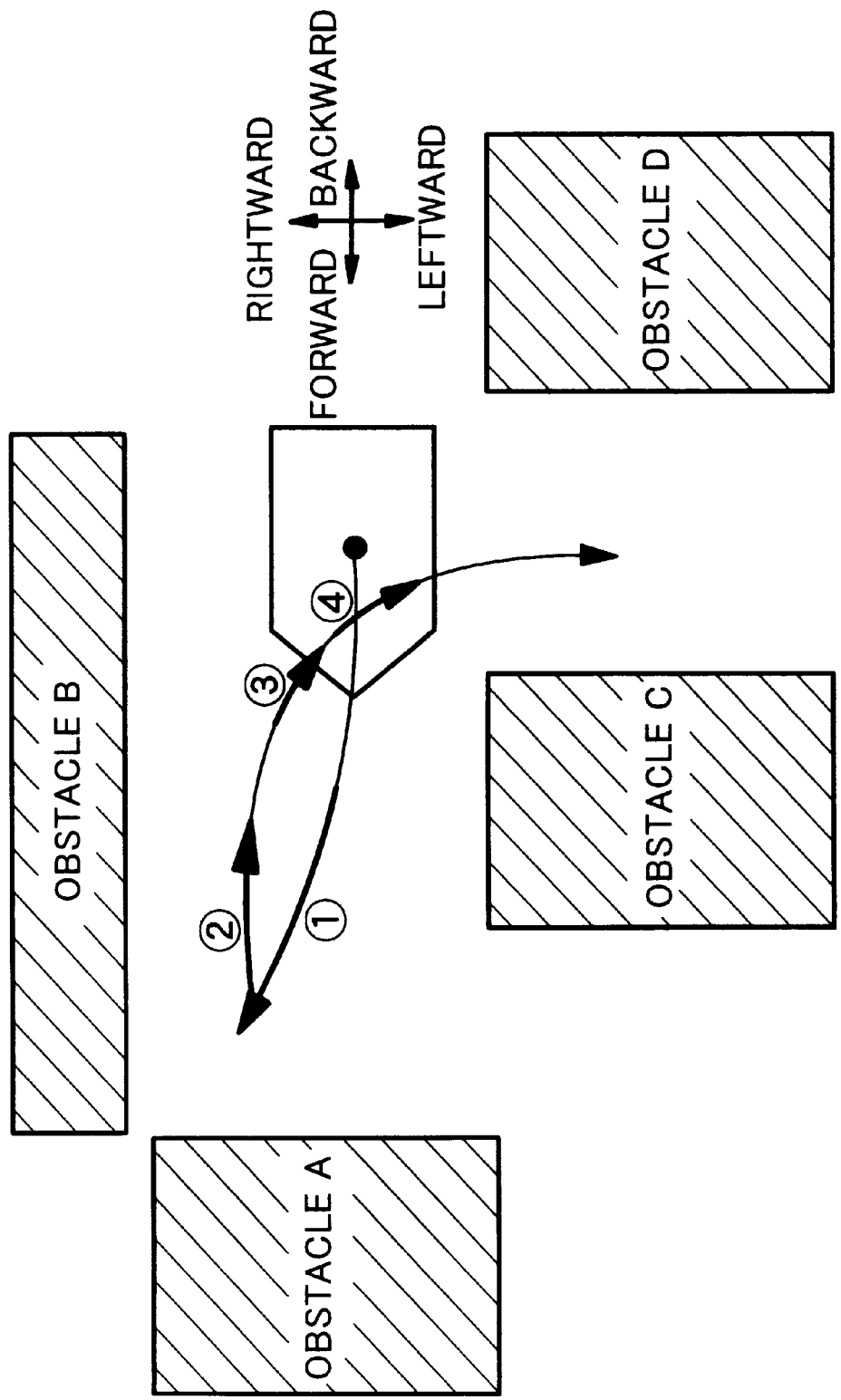

When automatic parking control operation is carried out with the vehicle V set in a back parking/left mode as shown in FIG. 4, the obstacles A–D are objects which may interfere with the vehicle. The obstacle A may interfere with the front left end of the vehicle while the vehicle travels forward along a path 1, the obstacle B may interfere with the front right end thereof while the vehicle travels backward along a path 2, the obstacle C may interfere with the left side surface thereof while the vehicle V travels backward along a path 3, and the obstacle D may interfere with the rear right end thereof while the vehicle V travels backward along a path 4.

Figure 5:
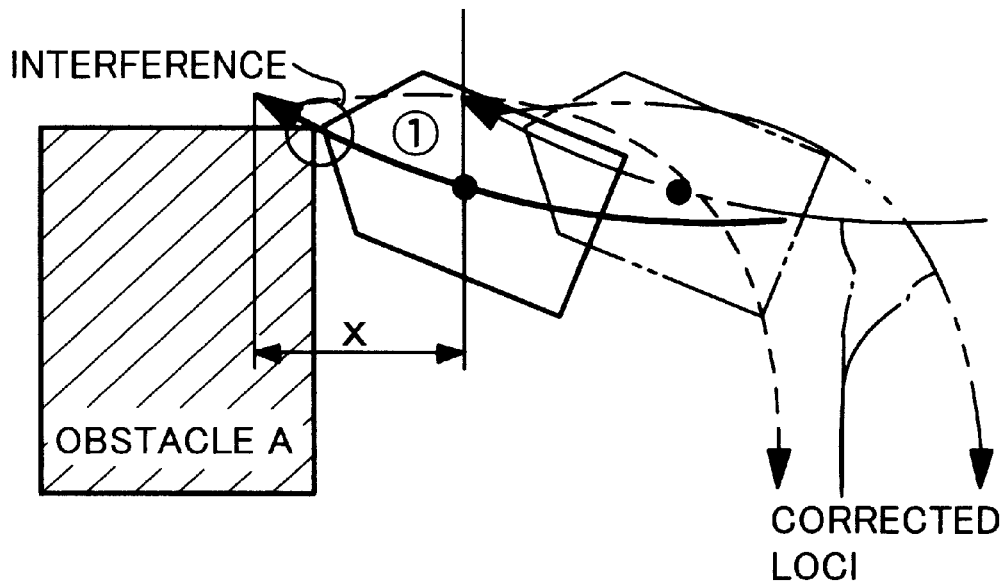

First, the avoiding of the obstacle A will be described. Referring to FIG. 5, when the vehicle V stops in a position of solid lines so as to avoid the interference with the obstacle A while the vehicle V travels forward along the path 1 by automatic parking control operation, the judging unit 24 judges that there is a possibility that the obstacle A will interfere with the vehicle V on the basis of an estimated locus of movement of the vehicle V stored in the storage unit 23 and the condition of the obstacle A detected by the object detecting means $S_4$, and this judgment is reported to the driver by the display on the operation stage display unit 11 or by the vocal means. When the driver then turns on the resumption judging switch $S_8$, the judging unit 24 judges whether or not the continuation of the execution of automatic steering control operation becomes possible if the starting position of the automatic steering control operation is changed, or whether or not the continuation of the execution of the automatic steering control operation becomes possible if the locus of movement of the vehicle V is changed, on the basis of an estimated locus of movement of the vehicle V stored in the storage unit 23 and the condition of the obstacle A detected by the object detecting means $S_4$.

In the case of FIG. 5, the automatic parking control operation of the vehicle V is interrupted due to the existence of the obstacle A in a position before the reversing position by a distance x. Accordingly, if the starting position is shifted backward by a distance x (refer to FIG. 4), the interference of the obstacle A with the vehicle V can be avoided. Actually, the distance x cannot be set limitlessly large due to the limited size of the frontage of the garage. Therefore, when the distance x is not more than a predetermined value (several 10 cm, preferably 20 cm), the judging unit 24 judges that the resumption of the automatic steering control operation can be effected. The fact that, if the starting position is shifted backward by the distance x, the automatic parking control operation can be carried out is then reported to the driver by the display on the operation stage display unit 11 or vocally.

When the driver receiving this information, turns on the obstacle avoiding switch $S_7$, the standard steering angle θref is reversely reproduced, and the vehicle V is moved to the starting position back along the original locus. Accordingly, the driver can shift the starting position backward by the distance x and restart the automatic parking control operation. This enables the vehicle V to be automatically parked without interference with the obstacle A.

Figure 6:
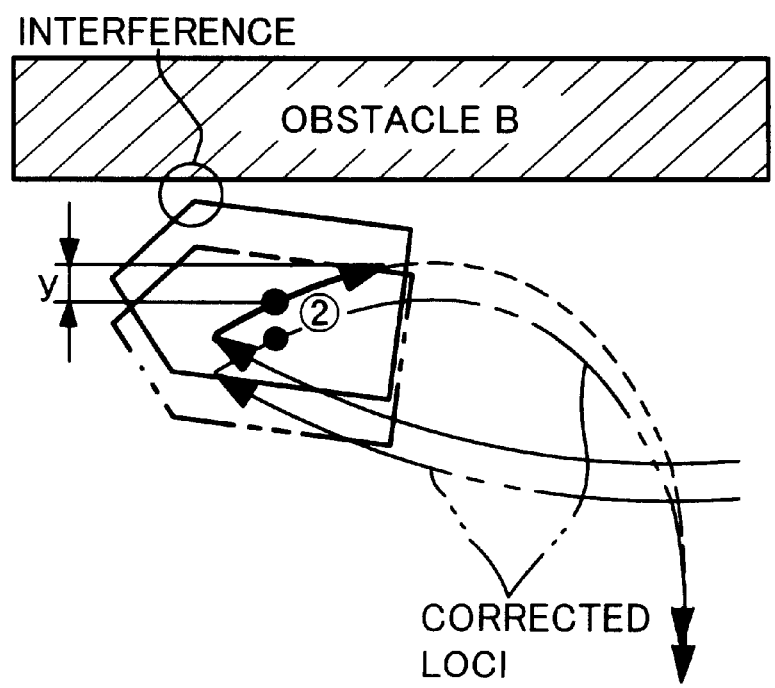

The avoiding of the obstacle B will now be described with reference to FIG. 6. When the automatic parking control operation is interrupted due to the existence of the obstacle B while the vehicle V travels backward along the path 2, the judging unit 24 judges that the continuation of the automatic parking control operation is impossible, and reports this judgment to the driver. If the automatic parking control operation is continued as it is in this case, the obstacle B interferes with the vehicle V by a distance y. Therefore, if the starting position is shifted leftward (refer to FIG. 4) by the distance y, the interference of the obstacle B with the vehicle can be avoided. Therefore, when the driver turns on the resumption judging switch $S_8$ and when the distance y is not more than a predetermined value (several 10 cm, preferably 20 cm), the judging unit 24 judges that the resumption of the automatic steering control operation is possible, and reports that if the starting position is shifted leftward by the distance y, the automatic parking control operation becomes possible by the display on the operation stage display unit 11 or vocally.

When the driver receiving this information turns on the obstacle avoiding switch $S_7$, the standard steering angle θref is reversely reproduced, and the vehicle V is moved back to the starting position along the original locus. Accordingly, the driver can shift the starting position leftward by the distance y and restart the automatic parking control operation. This enables the vehicle V to be automatically parked without the interference of the obstacle B therewith.

Figure 7A:
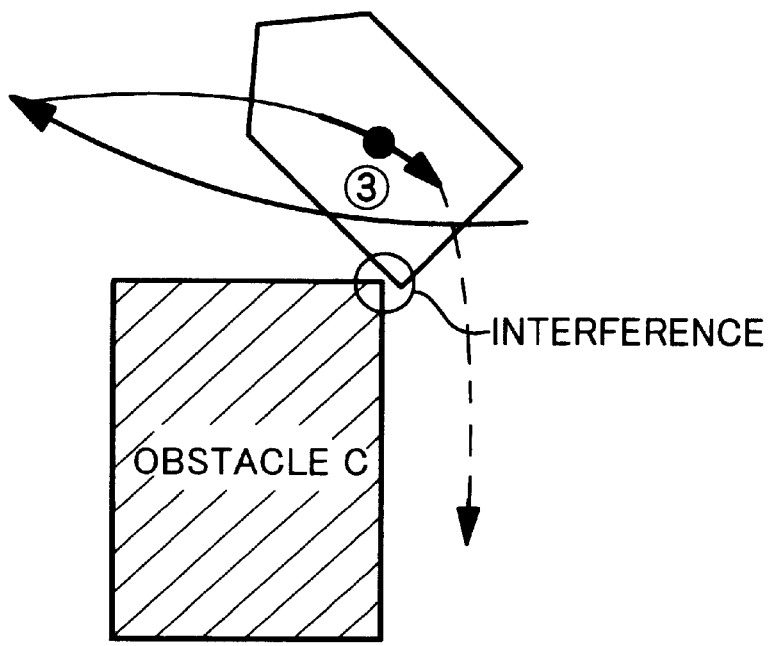
FIGS. 7A and 7B are drawings illustrating the avoiding of an obstacle C.

The avoiding of the obstacle C will now be described with reference to FIGS. 7A and 7B. When the automatic parking control operation is interrupted due to the existence of the obstacle C while the vehicle V travels backward along the path 3 as shown in FIG. 7A, the judging unit 24 judges that the continuation of the automatic parking control operation is impossible. When the driver then turns on the resumption judging switch $S_8$, the judging unit 24 judges whether or not the resumption of the automatic steering control operation can be done if the locus of movement of the vehicle V in the previous automatic steering control operation is changed, on the basis of the estimated locus of movement of the vehicle V stored in the storage unit 23 and the condition of obstacles detected by the object detecting means $S_4$.

Figure 7B:
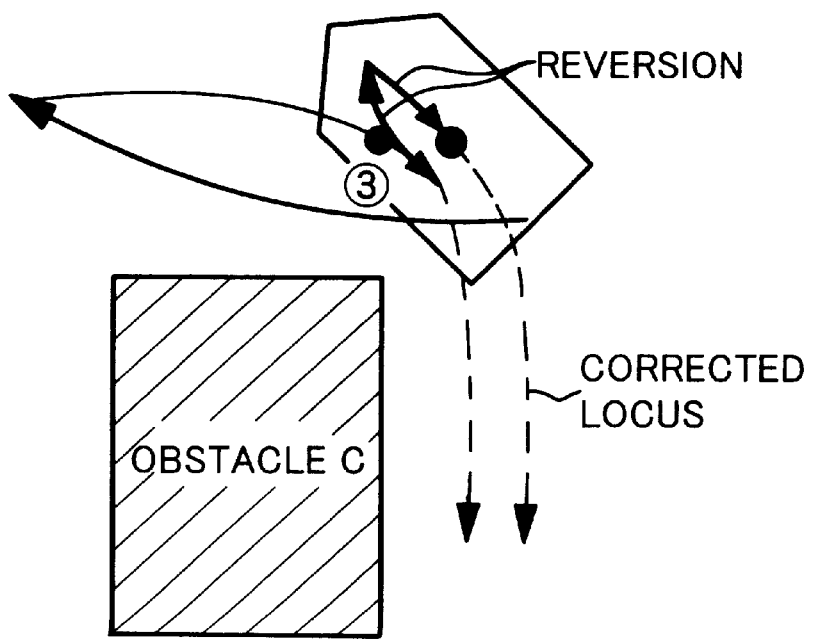

When the judging unit 24 judges that the resumption of the automatic parking control operation is possible, a reverse steering operation is automatically executed along a path stored in advance in the storage unit 23 correspondingly to each parking mode, as shown in FIG. 7B, and the position of the vehicle V is moved from the position in which the automatic parking control operation has been interrupted to a rearward position (see FIG. 4). The automatic parking control operation after the interruption at the position is then resumed, whereby the vehicle V can be moved to a parking position without interference of the obstacle C therewith. The distance of movement of the vehicle V taken when the vehicle is reversed may be fixed or changeable by an instruction given by the driver.

Figure 8A:
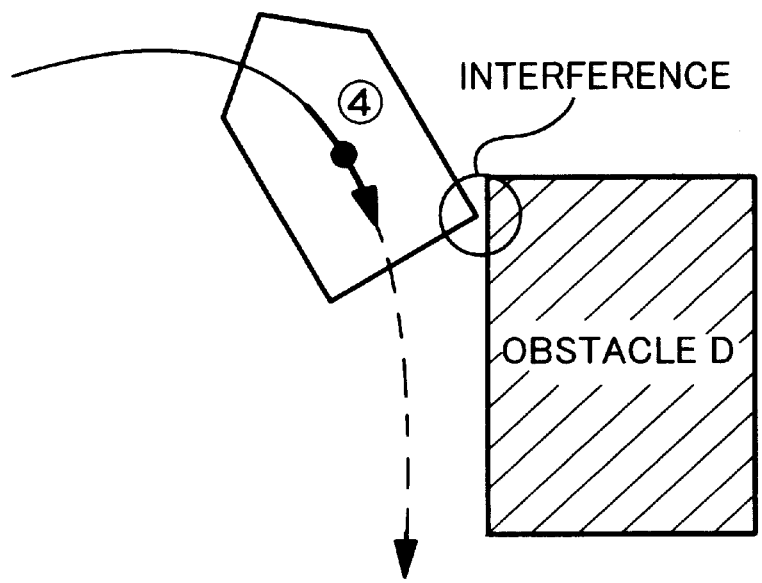
Figure 8B:
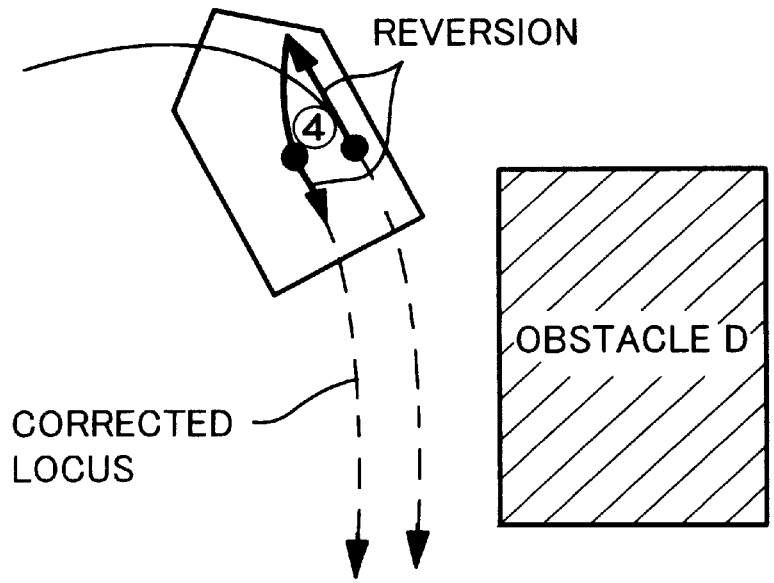

The avoiding of the obstacle D will now be described with reference to FIGS. 8A and 8B. When the automatic parking control operation is interrupted in the position in FIG. 8A due to the existence of the obstacle D while the vehicle V travels backward along the path 4, the driver turns on the resumption judging switch $S_8$. The judging unit 24 then judges whether or not the resumption of the automatic steering control operation becomes possible if the locus of movement of the vehicle V in the previous automatic steering control operation is changed. When the judging unit 24 judges that the automatic parking control operation can be resumed, a reverse steering operation is automatically executed along the path stored in advance in the storage unit 23, as shown in FIG. 8B, and the position of the vehicle is changed from the position in which the automatic parking control operation has been interrupted to a frontward position (see FIG. 4). Therefore, when the automatic parking control operation is resumed after the interruption at the position, the vehicle V can be moved to the parking position without interference of the obstacle D therewith.

When the judging unit 24 judges that the continuation of the automatic parking control operation is possible at the time of the interruption thereof, the driver can continue the automatic parking control operation as it is, completing the parking of the vehicle. When a judgment that the resumption of the automatic parking control operation is impossible is given after the resumption judging switch $S_8$ has been turned on, the vehicle may be parked by the driver's voluntary steering operation.

When the driver notices an obstacle and stops the automatic parking control operation in this manner, the judging unit 24 judges whether or not a change of the automatic steering control operation starting position or a change of the locus of movement of the vehicle V will enable the automatic steering control operation to be resumed after the resumption judging switch $S_8$ has been turned on even if the judging unit 24 judges that the continuation of the automatic parking control operation is impossible. Therefore, a judgment whether the parking of the vehicle by the automatic parking control operation can be accomplished more accurately.

According to the present invention, a judging means is provided for judging, when the automatic steering control operation by the control means is interrupted, whether or not the continuation of the execution of the automatic steering control operation is possible, on the basis of the content of data stored in the storage means and the detection results of the object detecting means. This enables the driver to judge correctly whether or not the automatic parking control operation should be continued, or whether the vehicle should be returned along the original path and subjected to an attempt to carry out the parking of the vehicle again. This enables the parking of the vehicle to be completed in a minimum period of time with minimum labor.

According to the present invention, the storage means stores the locus of movement of the vehicle as a steering angle with respect to the traveling distance of the vehicle, so that a predetermined locus of movement can be secured irrespective of the level of the vehicle speed during an automatic parking control operation.

According to the present invention, an informing means is provided for informing the driver of the judgment made by the judging means that the continuation of execution of automatic steering control operation is impossible. Therefore, it is possible to prompt the driver to carry out another parking operation instead of continuing the execution of the automatic steering control operation.

According to the present invention, when the judging means judges that the continuation of the execution of the automatic steering control operation is impossible, the same means further judges whether a change of the automatic steering control operation starting position enables the automatic steering control operation to be resumed, or whether a change of the locus of movement of the vehicle enables the automatic steering control operation to be resumed. This judgement is made on the basis of the content stored in the storage means. Therefore, when the resumption of the automatic steering control operation is possible, this operation is resumed, completing the parking of the vehicle in a minimum period of time with minimum labor. When the resumption of the automatic steering control operation is impossible, the resuming of the operation can be given up.

According to the present invention, a judgment by the judging means of whether the automatic steering control operation can be resumed is started on the basis of the operation of a switch means carried out by the driver, so that this judgment can be made according to the driver's intention.

According to the present invention, when a judgment that the resumption of the automatic steering control operation is possible is made, the control means guides the vehicle to the position in which the automatic steering control operation can be resumed. Therefore, the driver can resume the automatic steering control operation easily.

According to the present invention, the storage means stores in advance, the path along which the vehicle is guided to the position in which the automatic steering control operation can be resumed. Therefore, the vehicle can be guided reliably to the position in which the automatic steering control operation can be resumed.

According to the present invention, a judgment whether or not the resuming of the automatic steering control operation can be done, is started on the basis of the operation of the switch means carried out by the driver, so that this judgment can be made according to the driver's intention.

According to the present invention, an informing means is provided which is adapted to inform the driver, when a judgment that the automatic steering control operation can be resumed is made by the judging means, of the position in which the resuming of the automatic steering control operation can be done, or the traveling path to same position.

According to the present invention, the storage means stores in advance the position in which the resumption of the automatic steering control operation becomes possible, or the traveling path to the same position, so that the vehicle can be guided reliably to the position in which the resumption of the automatic steering control operation becomes possible.

According to the present invention, a judgment by the judging means whether the resuming of the automatic steering control operation can be effected is started on the basis of the operation of the switch means carried out by the driver, so that this judgment can be made according to the intention of the driver.

According to the present invention, the judging means makes a judgment that the automatic steering control operation can be resumed when the automatic steering control operation is interrupted, and when the remaining distance of movement of the vehicle, in the direction of advance of the vehicle stored in the storage means, is not larger than a predetermined distance. Therefore, a judgment whether the automatic steering control operation can be resumed can be made correctly.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An automatic steering apparatus having an automatic steering control operation and a capable of automatically parking a vehicle in a parking space while controlling said a steering actuator based on a predetermined locus of movement, said apparatus comprising:

said steering actuator that controls a steering angle of a wheel of the vehicle;

object detecting means for detecting an object around the vehicle and for determining if an object detected by the object detecting means is located in a path of the vehicle along the predetermined estimated locus of movement and for interrupting said automatic steering control operation when the detected object is located in the path of the vehicle along the predetermined estimated locus of movement;

storage means for storing the predetermined estimated locus of movement of the vehicle from a starting position to a target parking position in the parking space;

control means for automatically controlling said steering actuator based on said predetermined locus of movement stored in said storage means; and judging means for judging whether the automatic steering control operation is continued based on the predetermined locus of movement stored in said storage means and a position of the object detected by the object detecting means when the automatic steering control operation by said control means is interrupted.

2. An automatic steering apparatus for a vehicle according to claim 1, wherein said storage means stores the predetermined estimated locus of movement of the vehicle as a steering angle of the wheel with respect to a distance of the predetermined estimated locus of movement of the vehicle.

3. An automatic steering apparatus for a vehicle according to claim 1 or 2, wherein said apparatus includes an informing means for informing the driver that said judging means judges that said automatic steering control operation cannot be continued.

4. An automatic steering apparatus for a vehicle according to claim 1 or 2, wherein said judging means further judges, when a judgment is made that said automatic steering control operation cannot be continued, either one of whether a resuming of the automatic steering control operation due to a change of an automatic steering control operation starting position can be accomplished and whether the resuming of the automatic steering control operation due to a change of the predetermined estimated locus of movement of the vehicle can be accomplished, as a function of the content stored in said storage means.

5. An automatic steering apparatus for a vehicle according to claim 4, wherein said judging means starts the judgment whether the automatic steering control operation can be resumed, on the basis of an operation of a switch means operated by the driver.

6. An automatic steering apparatus for a vehicle according to claim 4, wherein said control means guides the vehicle to a position, in which the automatic steering control operation can be resumed, when said judging means judges that said automatic steering control operation can be resumed.

7. An automatic steering apparatus for a vehicle according to claim 6, wherein said storage means stores a predetermined guide path along which the vehicle is guided to a position in which the resuming of said automatic steering control operation can be accomplished.

8. An automatic steering apparatus for a vehicle according to claim 6, wherein said judging means starts the judgment of whether the automatic steering control operation can be resumed, on the basis of an operation of a switch means operated by the driver.

9. An automatic steering apparatus for a vehicle according to claim 4, wherein said apparatus is provided with an informing means for informing the driver of either one of a predetermined position in which the resuming of the automatic steering control operation can be accomplished and a predetermined traveling path up to the predetermined position when said judging means judges that the resuming of the automatic steering control operation can be affected.

10. An automatic steering apparatus for a vehicle according to claim 9, wherein said storage means stores either one of the predetermined position at which the resuming of the automatic steering control operation becomes possible and the predetermined traveling path leading to the predetermined position when the automatic steering control operation resumes.

11. An automatic steering apparatus for vehicles according to claim 9, wherein said judging means starts the judgment of whether said automatic steering control operation can be resumed, on the basis of an operation of said switch means operated by a driver.

12. An automatic steering apparatus for a vehicle according to claim 4, wherein said judging means judges that the automatic steering control operation can be resumed when a remaining distance of movement of the vehicle, in a direction where the vehicle travels at the time of an interruption of an automatic steering operation, stored in said storage means is equal to or less than a predetermined value.

13. An automatic steering apparatus for vehicles according to claim 10, wherein said judging means starts the judgment of whether said automatic steering control operation can be resumed, on the basis of an operation of said switch means operated by a driver.

* * * * *